United States Patent

[11] 3,621,958

| [72] | Inventor | Edwin O. Klemm |
| | | Saginaw, Mich. |
| [21] | Appl. No. | 64,248 |
| [22] | Filed | Aug. 17, 1970 |
| [45] | Patented | Nov. 23, 1971 |
| [73] | Assignee | Saginaw Products Corporation |
| | | Saginaw, Mich. |

[54] BIDIRECTIONAL NO-BACK UNIT FOR BALL SCREW UTILIZING ROLLER CAMS
20 Claims, 6 Drawing Figs.

| [52] | U.S. Cl. | 192/8 R, |
| | | 188/134 |
| [51] | Int. Cl. | F16d 67/00 |
| [50] | Field of Search | 192/8 R, |
| | | 144; 188/134 |

[56] References Cited
UNITED STATES PATENTS

| 2,783,861 | 3/1957 | Jungles | 192/8 R |
| 2,925,157 | 2/1960 | Davis | 192/8 R |
| 2,997,146 | 8/1961 | Chiolerio | 192/8 R |

*Primary Examiner*—Allan D. Herrmann
*Attorney*—Learman & McCulloch

ABSTRACT: Apparatus comprising a rotatable output member, a rotatable drive member for rotating the output member in either direction, a releasable brake for substantially preventing rotation of the output member in either direction when it is not being driven by the drive member, and mechanism operable to release the brake upon a predetermined rotation of the drive member in either direction.

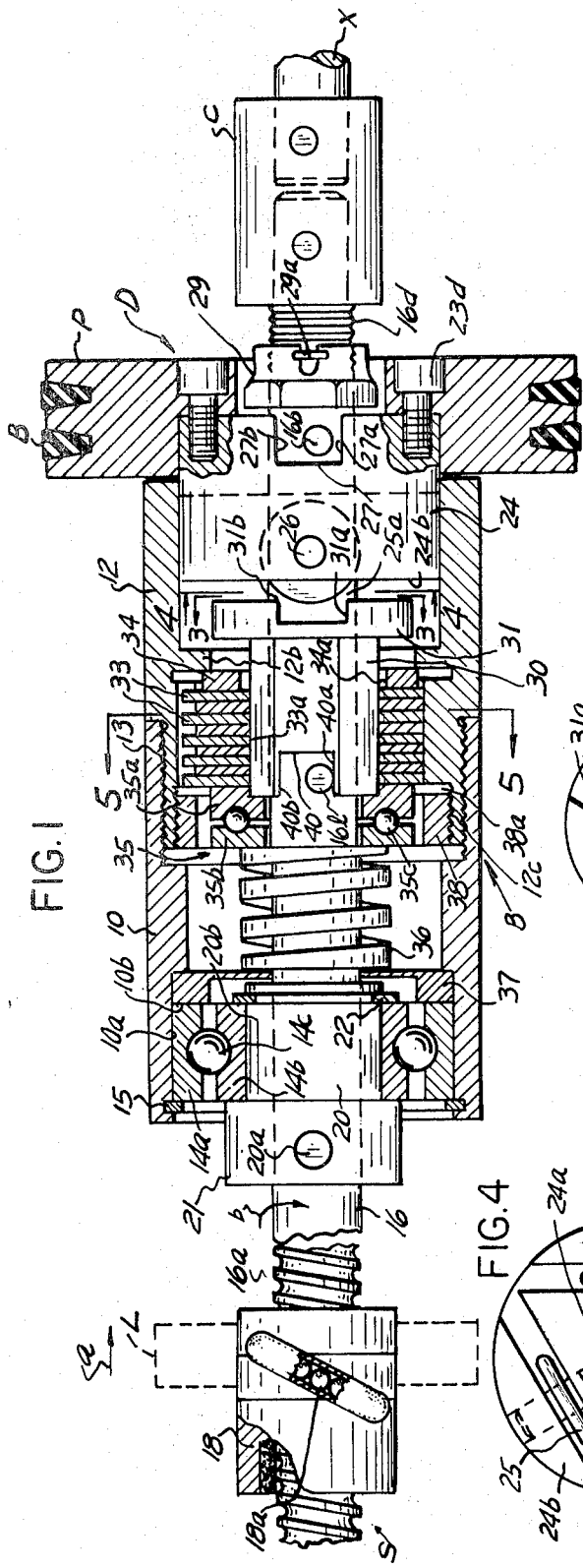

BIDIRECTIONAL NO-BACK UNIT FOR BALL SCREW UTILIZING ROLLER CAMS

This invention relates to no-back apparatus, and more particularly, bidirectional no-back apparatus for substantially preventing the rotation of an output member when it is not being driven in either direction by the input member.

There are many instances in which the exact positioning of a load-carrying member to be moved is critical. Many of the devices which must be so positioned include a rotatable output member driven by a rotatable input member. In some applications, after the driving force applied to the rotatable input member has been removed, the force applied to the rotatable input member has been removed, the force exerted on the output member by the load carried thereby is such as to rotate the output member in a direction opposite to that in which it was driven by the input member. In other instances, when the output member is being driven, the load is applied in a way such as to cause the output member to be driven at a rate faster than the rate at which it was being driven by the drive member. In this latter situation, the output member is actually no longer being driven by the input member although the drive has not been disconnected, and the "runaway" condition which results frequently causes an improperly positioned load, and may also be hazardous. In either instance, it is imperative that the output member be substantially prevented from rotating when driving force is no longer being exerted, to accurately position the output member and the load connected thereto.

Accordingly, it is an object of the present invention to provide apparatus for substantially preventing rotation of a rotatable output member in either direction after the force driving the input member has been removed therefrom.

A jackscrew, commonly employing a screw shaft cooperating with a recirculating ball nut to raise a load supported on the nut, is a typical application with which the bidirectional no-back apparatus, formed according to the invention, may be utilized. Because of the high energy-transmitting efficiency of the recirculating ball nut and screw, when the load has been raised to the proper level, and the load-lifting force on the screw is removed, the downward force of the load exerted on the nut will tend to rotate the screw in a reverse direction so as to lower the load from its proper position. Accordingly, it is yet another object of the present invention to provide no-back apparatus particularly suited to this situation for preventing the reverse rotation of a load-positioning member while permitting the member to be freely driven forwardly.

When a load supported on a jackscrew of this type is to be lowered, it is important that the lowering be accomplished quickly, easily, and without the manipulation of unlocking levers, or the like, which must be reset to release the no-back apparatus prior to the screw shaft being driven in an opposite direction.

Accordingly, a still further object of the present invention is to provide bidirectional no-back apparatus which will eliminate the preparation necessary in some prior art devices to move the output member in either direction.

Briefly, according to the present invention, there is provided an input drive member, means journaling the input drive member for rotation, means for revolving the input drive member in either direction, an output member to be driven, means journaling the output member for rotation in either direction, means coupling the input member with the output member, releasable brake means for selectively substantially preventing rotation of the output member in either direction when it is not being driven by the input drive member, and releasing means cooperating with the drive member and operable to release the brake means upon rotation of the output member in either direction by the drive member.

The invention and advantages thereof will best be understood from the following description of an embodiment thereof when read in connection with the accompanying drawings, wherein;

FIG. 1 is a side elevational, sectional view illustrating my bidirectional apparatus drivingly connected with a ball screw shaft for controlling its movement;

FIG. 2 is a fragmentary, side elevational view illustrating portions of the apparatus in a slightly rotated brake-releasing position;

FIG. 3 is an end elevational view of the disc brake hub only, taken along the line 3—3 of FIG. 1;

FIG. 4 is a fragmentary, end elevational view taken along the line 4—4 of FIG. 1;

FIG. 5 is a fragmentary sectional end elevational view, taken along the line 5—5 of FIG. 1; and FIG. 6 is an end elevational view illustrating one of the brake discs.

Referring now more particularly to the drawing, bidirectional apparatus formed according to the invention includes an annular housing generally designated H comprising two tubular-shaped sections 10 and 12 which are threadedly connected at 13. The section 10 mounts, in an annular recess 10a, the outer race 14a of a ball bearing assembly generally designated 14 which journals a reduced diameter portion 20b of a sleeve 20 pinned at 20a to the nonthreaded portion 16 of a rotatable output ball screw shaft S. The bearing assembly 14 also includes an inner race 14b cooperating with the race 14a to provide a raceway for the balls 14c As exemplary of the type of load which may be connected with the output shaft S, a recirculating ball nut 18 is provided and included recirculating balls 18a received within the threaded portion 16a of the screw S in the normal manner to move a load, schematically illustrated at L. The outer race of the assembly 14 is retained by a snap ring 15, whereas the inner race of the bearing 14 is retained by a snap ring 22.

Apparatus for driving the shaft S in either direction of rotation is generally shown at D and includes a sheave P driven by belts, shown at B, and mounting a drive drum 24 with suitable bolts 23a. The drive drum 24 is provided with a bore 24a rotatably receiving the screw shaft portion 16. As viewed in FIG. 1, the left end face 24b of the drive drum 24 includes a triangularly shaped slot or groove 24c (FIG. 4), and a roller wheel 25 is mounted in each leg of the triangular slot with a suitable pivot pin 26. At its opposite end, the drum 24 is notched at 27 for freely receiving a pin 16b projecting radially outwardly of the shaft portion 16. The portion 16d of the shaft S adjacent the sheave P threadedly receives an adjustable stop nut 29 which is fixed in position by a cotter pin 29a and limits the axial movement of the sheave P on the shaft portion 16a. The notch 27 and pin 16b form a lost motion connection between drive member D and shaft S. When the drive member D is rotated by the sheave P, the pin 16b engages one of the sidewalls 27a or 27b of the notch 27, as shown in FIG. 2, to rotate the shaft S. If desired, an additional load may be driven by a shaft X removably connected with the shaft portion 16 by a coupling C.

To prevent rotation of the shaft S when it is not drivingly connected with the drive apparatus D, brake apparatus, generally shown at B, is provided and includes an axially displaceable member comprising a hexagonally shaped brake hub 30 having a cylindrical bore 30a (FIG. 3) therethrough for rotatably receiving the screw shaft portion 16. The axially displaceable member has an enlarged annular flanged head portion 31 with an end face formed with a plurality of radially outwardly extending equiangularly disposed notches 31a for partially receiving the rollers 25. The sharp edges 31b of the notches 31a are case hardened to prevent wear which would otherwise result from repeated engagement with the rollers 25.

The hexagonally shaped hub 30 mounts a set of longitudinally spaced-apart friction brake discs 32, (FIG. 6), each having a hexagonally shaped bore 32a therethrough in sliding engagement with the outer surface 30b of the hexagonally shaped hub 30. As also shown in FIG. 1, a second set of brake discs 33 are axially interposed between the brake discs 32, each including a cylindrical bore 33a receiving the hexagonally shaped hub 30 and a plurality of projections 33b circumferentially spaced about the outer periphery thereof and adapted to slide in complementally formed axial slots 12a formed in the housing portion 12.

Sandwiched between one end of the stack of coacting brake discs 32 and 33, and an annular shoulder 12b, which is integrally formed with the stationary housing 12, is an annular friction disc 34 having a bore 34a passing the hub 30. The friction discs 32, 33 and 34 may be formed of any commercially available brake lining material. At the other end of the stack of friction discs 32 and 33 is a thrust bearing, indicated generally at 35, including an inner race 35a bearing against the end disc 33 and an outer race 35b which together provide a raceway for a plurality of ball bearings 35c. A coil spring 36 is compressed between a washer 37, which is journaled on the shaft S adjacent the hub 20, and the race 35b of the thrust bearing 35. To prevent the discs 32 and 33 from sliding off the end of the hub 30, an annular collar 38 is threadedly received within the internally threaded portion 12c of the housing portion 12 and a space 38a is provided between the collar 38 and the housing 12 to permit expansion of the brake disc assembly in a manner to be presently described. The hub 30 has a lost motion connection with the shaft S which includes a radially extending pin 16e on the shaft S which is axially aligned with the pin 16b and received within an axially extending notch 40, formed in the end of the hub 30.

In operation, assuming that the parts are initially in the position shown in FIG. 1, and that the load L exerts a thrust force in a direction indicated by the arrow a, tending to rotate the screw shaft S counterclockwisely in the direction of the arrow b, the pin 16e will initially be in engagement with the side 40a of the slot 40 on the holder 30. For example, if the device were utilized in a vertically extending jack the forces of gravity would impose such a load L in the direction a. The rollers 25 will be disposed within the notches 31a, and the brake discs 32, 33 and 34 are pressed into braking engagement by the spring 36. With the brake discs in tightly engaging relation, the screw shaft S is prevented from rotating in the direction b and could have only an immaterial rotation in the opposite direction.

When it is desired to move the load L to the left, as viewed, in FIG. 1, the sheave P is driven clockwisely in the direction of the arrow c and the side 27a of the slot 27 is rotated into engagement with the driving lug 16b on the screw shaft S and begins to rotate the screw shaft S without, as yet, disturbing the locked position of the brake discs 32, 33 and 34. As the sheave P continues to revolve, the rollers 25 move to engage the hardened edges 31b and are forced to ride up the hardened edges 31b to drive the hub 24 axially in one direction rearwardly into engagement with the stop 29 (FIG. 2). Thereafter the wheels or rollers 25 force the hub 30 axially in the opposite (forward) direction to overcome the bias of spring 36 and release the pressure on the brake discs 32, 33 and 34 to permit the screw shaft S to be freely driven by the sheave P via driving lug 16b. As the shaft S continues to revolve in the direction C, as shown in FIG. 2, the lug 16e contacts the opposite side 40b of the notch 40, to halt the relative rotation between the rollers 25 and the hub 30 and to revolve the brake holder 30 and brake discs 32 thereon, while the screw shaft 16, which is being continually revolved by the sheave P, moves the nut 18 mounting the load L toward the left.

When the load L has been driven to the left to the proper position, the driving force on the sheave P is removed to halt the load in position. When the sheave P is heated, the continued thrust force of the load L in the direction of the arrow a biases the shaft S to revolve oppositely in the direction of the arrow b. When the shaft S revolves in the direction of arrow b, the lug 16e moves freely within the notch 40, however, the lug 16b counterrotates the drive drum member 24 to move the rollers 25 out of engagement with the edges 31b of the notches 31a and return them to their original position within notches 31a shown in FIG. 1. It is important to note that each edge 31b of the notches 31a has only a substantially "line contact" with a roller 25 and is the only portion of the hub 30 which is in engagement with the rollers 25 to cause the hub 30 to move axially. It is also important to note that the sides of the notches 31a are substantially parallel to the axis of the shaft S and provide a sharp dropoff. Thus, the brake B is applied very quickly as the rollers 25 are driven counterclockwisely by the shaft S without the use of an additional friction member to hold the hub 30 during the reverse rotation. The use of such an additional friction member would create an unnecessary drag on the output member when it is being rotated. This is important so that the load L will be positioned as accurately as possible and so that the shaft S has not attained a high reverse velocity which would otherwise be difficult to brake.

Because pin 16e moving within the slot 40 provides a lost motion connection between the screw shaft S and the brake B, the brake disc holder 30 is permitted to momentarily remain motionless while the screw shaft S continues to be moved in the direction of the arrow b by the load L. When the lug 16e reengages the opposite side 40a of the notch 40, as shown in FIG. 1, further rotation of the screw shaft S is prevented because the wheels 25 have entered the slots 31 and the brake discs 32, 33 and 34 are now compressed into braking engagement to lock the hub 30 to the housing H.

As shown in FIG. 1, there is a slight clearance 25a between the periphery of the rollers 25 and the hardened edges 31b when the rollers 25 are received within notches 31a. This clearance permits the brake discs 32, 33 and 34 to slightly wear and still maintain the edges 31b out of engagement with the wheels 25 in the position of the parts. If the brake wear should exceed the predetermined spacing 25a, the stop nut 25 may be adjusted on the threaded portion 16d of the shaft to provide the proper clearance which assures quick and positive braking.

If the thrust force of the load L should be suddenly opposite the direction of the arrow a when the sheave S is being driven in the direction of the arrow c to move the load L toward the left as viewed in the drawings, the screw shaft S would tend to rotate faster than the speed of rotation of the driver D which is not affected by such a sudden overrunning movement because of the lost motion connection between the shaft S and driver D. The lug 16e would drive the hub 30 at a faster rate than the member 24, thus advancing the notches 31a ahead of the rollers 25 and allowing the spring pressure on the disc holder 30 to brake the shaft S as the notches 31a quickly move away from the rollers 25. Thus, it can be seen that a positive acting bidirectional no-back mechanism has been provided.

To move the load toward the right as viewed in FIG. 1, the sheave P is driven counterclockwisely in a direction opposite arrow c so that the rollers 25 engage the opposite "line contact" edges 31b of the slots 31a to again move the hub 30 toward the left and release the brake B. The side 27b of the notch 27 engages the drive lug 16b to drive the screw shaft S in the direction of the arrow b. The no-back mechanism operates bidirectionally in a similar manner when the drive is removed and to prevent overrunning In this manner, the movement of the load L is easily and safely controlled without any jarring action.

It is to be understood that the drawings and descriptive matter are in all cases to be interpreted as merely illustrative of the principles of the invention, rather than limiting the same in any way, since it is contemplated that various changes may be made in various elements to achieve like results without departing from the spirit of the invention or the scope of the appended claims.

I claim:

1. Apparatus in which the bidirectional rotation of rotatable output means is controlled comprising:
   rotatable drive means for selectively driving said rotatable output means in either direction of rotation;
   brake means for selectively preventing rotation of said rotatable output means and being movable from a braking position for preventing rotation of said rotatable output means in either direction to a nonbraking position;
   means for moving said brake means between said braking and nonbraking positions including:
   brake mount means operably coupled with said rotatable output means and said brake means, rolling means on one of said mount means and said drive means;

a rolling means receiving portion on the other of said mount means and said drive means including edge means providing substantially line contact engaging surface means with said rolling means when engaged therewith;

said rolling means cooperating only with said engaging surface means, after a predetermined relative angular displacement of said rolling means and said receiving portion in a first direction, for moving said brake means to said nonbraking position and after a predetermined angular displacement in the opposite direction for permitting said brake means to return to said braking position.

2. The combination as set forth in claim 1 wherein said rolling means receiving portion includes a notch formed in one of said mount means and drive means, and said edge means consists of the edge of the sidewall of the notch.

3. The combination as set forth in claim 2 wherein said notch has marginal sidewalls lying in planes which are substantially parallel to the axis of rotation.

4. The combination as set forth in claim 2 wherein the diameter of said rolling means is greater than the width of said notch.

5. The combination as set forth in claim 2 wherein said rolling means and notch means are mounted to provide play between them in the nonbraked position.

6. The combination as set forth in claim 5 including means for adjusting the play provided.

7. The combination of claim 1 including first lost motion connection means between said drive means and said rotatable output means.

8. The combination of claim 7 wherein said first lost motion connection means includes means for coupling said drive means with said rotatable output means, after a predetermined relative angular displacement of said rotatable drive means and said rotatable output means, to drive said rotatable output means.

9. The combination as set forth in claim 7 including second lost motion connecting means between said brake means and said rotatable output means to prevent rotation of the brake means until said brake means is in nonbraking position.

10. The combination as set forth in claim 7 wherein said brake mount means is coaxially received on said rotatable output means; said second lost motion connecting means including radially extending pin means, and said brake mount means including slot means receiving said pin means and permitting relative angular displacement of said rotatable output means and said brake mount means.

11. The combination as set forth in claim 1 wherein said brake mount means includes a hub mounted on the rotatable output means; said brake means includes a plurality of friction discs slidably mounted on said hub, and spring means is provided for biasing said friction discs into engagement.

12. The combination as set forth in claim 11 wherein said rolling means comprises a plurality of wheel members mounted for rotation about generally radially extending axes, and said rolling means receiving portion comprises a plurality of slots in an end face of said hub for receiving said wheels.

13. The combination as set forth in claim 1 including means for limiting the relative angular displacement between said brake mount means and said drive means.

14. The combination of claim 13 wherein said limiting means comprises means forming a lost motion connection between said rotatable output means and said brake mount means.

15. The combination of claim 13 wherein said means forming said lost motion connection comprises a radially extending pin on said rotatable output means, and a slot on said mount means receiving said pin.

16. Apparatus comprising:
a housing;
input drive means rotatably mounted in said housing;
rotatable output means selectively drivable in either direction of rotation by said input drive means after an initial relative angular displacement therebetween; and
bidirectional no-back apparatus for precluding rotation of said output means relative to said housing when said output means is not being driven by said input drive means including;
a brake support member mounted on said output means for rotation relative thereto;
braking means mounted on said brake support member for movement between a nonbraking position and a braking position when one of said brake support member and drive means is rotated relative to the other to prevent rotation of said rotatable output means in either direction;
yieldable means for normally urging said braking means into said braking position; and
cooperating means on said input drive means and said brake support member for moving said braking means to said nonbraking position when one of said brake support member and said drive means is rotated relative to the other.

17. Bidirectional drive apparatus as set forth in claim 16 wherein said cooperating means includes at least one roller rotatably mounted about a fixed pivot one one of said input drive means and brake support member and cooperating with roller-receiving means formed on the other of said input drive means and said brake support member.

18. Bidirectional drive apparatus as set forth in claim 16 including lost motion connecting means between said brake support member and said rotatable output means to permit relative rotation between said brake support member and said output means.

19. Bidirectional drive apparatus as set forth in claim 18 wherein said lost motion connecting means comprises a lug on one of said output means and said brake support member and lug-receiving means on the other of said output means and said brake support member.

20. In combination with rotatable output means;
rotatable drive means coupled to said rotatable output means with a lost motion connection for selectively driving said rotatable output means in either direction of rotation;
brake means coupled to said rotatable output means with a lost motion connection and being mounted for angular movement relative to said drive means, said brake means including means, movable from a nonbraking position to a braking position, for braking rotation of said rotatable output means in either direction when said brake means and said drive means are relatively angularly displaced and being returnable to said nonbraking position when said brake means and drive means are angularly returned;
said output member and said brake means being relatively angularly displaced in said first direction in response to rotation of said output member by said drive means; and
means responsive to rotation of the drive means in either direction for moving said brake means from braked position.

* * * * *